United States Patent
Bogdan (10) Patent No.: US 6,191,790 B1
(45) Date of Patent: Feb. 20, 2001

(54) INHERITABLE PROPERTY SHADING SYSTEM FOR THREE-DIMENSIONAL RENDERING OF USER INTERFACE CONTROLS

(75) Inventor: Jeffrey L. Bogdan, Redmond, WA (US)

(73) Assignee: Microsoft Corporation, Redmond, WA (US)

( * ) Notice: Under 35 U.S.C. 154(b), the term of this patent shall be extended for 0 days.

(21) Appl. No.: 09/053,282

(22) Filed: Apr. 1, 1998

(51) Int. Cl.⁷ .................................................. G06T 15/60
(52) U.S. Cl. ............................................ 345/426; 345/150
(58) Field of Search .................................. 345/426, 420, 345/133, 139, 418, 419, 423, 339, 421; 395/327, 356; 707/501, 513

(56) References Cited

U.S. PATENT DOCUMENTS

| | | | |
|---|---|---|---|
| 4,916,656 | 4/1990 | Sasaki ................................ | 364/900 |
| 5,237,654 | 8/1993 | Shakelford et al. ................ | 395/160 |
| 5,312,478 | 5/1994 | Reed et al. ......................... | 395/148 |
| 5,339,391 | 8/1994 | Wroblewski et al. .............. | 395/157 |
| 5,371,846 | 12/1994 | Bates ................................... | 395/157 |
| 5,388,196 | 2/1995 | Pajak et al. ........................ | 395/153 |
| 5,402,152 | 3/1995 | Needham ........................... | 345/179 |
| 5,418,549 | 5/1995 | Anderson et al. ................. | 345/145 |
| 5,452,406 | 9/1995 | Butler et al. ...................... | 395/126 |
| 5,479,600 | 12/1995 | Wroblewski et al. ............. | 395/157 |
| 5,506,951 | 4/1996 | Ishikawa ........................... | 395/157 |
| 5,517,603 | * 5/1996 | Kelley et al. ...................... | 395/126 |
| 5,526,480 | 6/1996 | Gibson .............................. | 395/154 |
| 5,528,735 | 6/1996 | Strasnick et al. ................. | 395/127 |
| 5,532,715 | 7/1996 | Bates et al. ....................... | 345/123 |
| 5,548,703 | 8/1996 | Berry et al. ....................... | 395/160 |
| 5,553,225 | 9/1996 | Perry ................................. | 395/157 |
| 5,555,354 | 9/1996 | Strasnick et al. ................. | 395/127 |
| 5,561,752 | * 10/1996 | Jevans ............................... | 345/419 |
| 5,590,267 | 12/1996 | Butler et al. ...................... | 395/340 |
| 5,619,628 | 4/1997 | Fujita et al. ....................... | 395/127 |
| 5,655,094 | 8/1997 | Cline et al. ........................ | 395/341 |
| 5,673,401 | * 9/1997 | Volk et al. ......................... | 395/327 |
| 5,692,173 | 11/1997 | Chew ................................. | 395/603 |
| 5,692,205 | 11/1997 | Berry et al. ....................... | 395/788 |
| 5,706,505 | 1/1998 | Fraley et al. ...................... | 395/614 |
| 5,717,877 | 2/1998 | Orton et al. ....................... | 395/326 |
| 5,739,819 | * 4/1998 | Bar-Nahum ....................... | 345/426 |
| 5,754,808 | 5/1998 | Tanaka et al. ..................... | 395/339 |
| 5,796,404 | 8/1998 | Gentner ............................. | 345/352 |
| 5,828,374 | 10/1998 | Coleman et al. .................. | 345/341 |
| 5,831,606 | 11/1998 | Nakajima et al. ................. | 345/326 |
| 5,838,319 | 11/1998 | Guzak et al. ...................... | 345/340 |

(List continued on next page.)

OTHER PUBLICATIONS

*Platform SDK*, MSDN Library, Jul. 1999.
*Win 32 Programmers Reference*, Chapter 14, Microsoft Press, 1993.
*Microsoft Windows 98 Official Preview Kit*, pp. 49–53, Microsoft Press, 1997.

Primary Examiner—Mark R. Powell
Assistant Examiner—G. F. Cunningham
(74) Attorney, Agent, or Firm—Klarquist Sparkman Campbell Leigh & Whinston, LLP (57) ABSTRACT

A system that supports a uniform three-dimensional rendering of components on a display screen by allowing a new component to inherit the shading properties of a parent component. The system provides for escalation of a search for shading properties, including at least a baseline shading face color, from any one of a plurality of shading property sources that can include, but are not limited to, an expressly defined shading property, an inheritable property from a parent component, and a system property in an absence of any other shading property source. Consistent gradations of color shading that facilitate three-dimensional visual cues among a component family hierarchy are generated and rendered on the display screen based on a baseline shading face color.

13 Claims, 5 Drawing Sheets

U.S. PATENT DOCUMENTS

| | | | |
|---|---|---|---|
| 5,838,330 | 11/1998 | Ajima | 345/427 |
| 5,854,634 | 12/1998 | Kroitor | 345/473 |
| 5,861,885 | 1/1999 | Strasnick et al. | 345/355 |
| 5,870,098 * | 2/1999 | Gardiner | 345/426 |
| 5,872,566 | 2/1999 | Bates et al. | 345/341 |
| 5,874,961 | 2/1999 | Bates et al. | 345/341 |
| 5,877,766 | 3/1999 | Bates et al. | 345/357 |
| 5,896,132 | 4/1999 | Berstis et al. | 345/341 |
| 5,903,271 * | 5/1999 | Bardon et al. | 345/419 |
| 5,913,063 | 6/1999 | McGurrin et al. | 395/702 |
| 5,923,328 | 7/1999 | Griesmer | 345/357 |
| 5,933,549 | 8/1999 | Ide et al. | 382/309 |
| 5,943,052 | 8/1999 | Allen et al. | 345/341 |
| 5,956,736 * | 9/1999 | Hanson et al. | 707/513 |
| 5,966,133 * | 10/1999 | Hoppe | 345/420 |
| 5,973,663 | 10/1999 | Bates et al. | 345/123 |
| 5,977,972 | 11/1999 | Bates et al. | 345/341 |
| 5,986,661 * | 11/1999 | Hemingway | 345/421 |
| 6,005,573 | 12/1999 | Beyda et al. | 345/341 |

OTHER PUBLICATIONS

*Visual C ++ Programmer's Guide*, MSDN Library, Jul. 1999.

*Microsoft Foundation Classes and Templates*, Class Library Reference, MSDN Library, Jul. 1999.

\* cited by examiner

INHERITABLE PROPERTY SHADING SYSTEM FOR THREE-DIMENSIONAL RENDERING OF USER INTERFACE CONTROLS

FIELD OF THE INVENTION

This invention relates to shading in User Interface (UI) displays, and in particular to a shading system that facilitates a three dimensional rendering of a UI control by way of inheritable shading properties for a given display on a display screen.

PROBLEM

Computer systems and computing devices have historically gone to great lengths to present uniform color models among component families and realistic three-dimensional view of images among component families displayed on two-dimensional display screens. Uniform color models for color screen displays include, but are not limited to, background colors, foreground colors, and border colors. Among the types of images that are desirable to display in three-dimensions are UI controls that include, but are not limited to, buttons, boxes, lists, tool bars, status bars, and the like. UI controls and/or other window objects or display images on a display screen are also referred to more generically as components.

One reason a three-dimensional view of UI controls on a display screen is more desirable is because display screens are increasingly crowded with UI controls and other information that can make a display look too busy so that one control is nearly indistinguishable from the next. For this reason, existing UI display screens display three-dimensional renderings of raised or recessed components to a user viewing the two-dimensional display screen, in addition to using color shading to enhance the visual cues of three-dimensional components to a user viewing the two-dimensional display screen. It is the selection of the shading properties for color shading in a three-dimensional component that is the problem addressed by the present invention.

One problem with existing display screen properties is that the color models are based on default or standard system-wide properties used by each new component being created. Although standard system-wide properties facilitate a consistent look among families of components, standard system-wide properties also limit the flexibility, creativity, and individuality of component renderings among independent applications.

One alternative to using the standard system-wide properties to create a new component is for each new component to implement and support its own shading properties without assistance from the operating system. However, implementing and supporting an independent color shading model requires significant effort on the part of each new component and it is unnecessarily duplicative to individually undertake such an effort.

For these reasons, there exists an ongoing need for alternative levels of display property sources to facilitate flexible implementation while maintaining uniform system-wide techniques for rendering three-dimensional components on a display screen. A system of this type has heretofore not been known prior to the invention as described below.

SOLUTION

The problems identified above are solved and an advancement is achieved in the field of UI shading controls due to the inheritable property shading system of the present invention. The inheritable property shading system of the present invention facilitates the inheritable selection of shading properties for use in rendering three-dimensional components without having to rely on predefined system-wide defaults. That is, if a shading property is not defined in a given child component at the time the component is created, that child component can search its parent component hierarchy for inheritable shading properties. Absent any other source, shading properties and other properties can be obtained from available system properties. However, using inherited properties ensures that each component in a component family hierarchy is consistent in its display characteristics.

When any three-dimensional shading is required for a given component, an inherited background color is used and treated as a shading face color. As other gradations of shading are required for any other coloring including three-dimensional shading, each additional shade is generated based on a baseline shading face color. Although numerous alternative techniques exist for rendering three-dimensional components on a display screen, one example technique for generating and shading three-dimensional components is disclosed in U.S. Pat. Nos. 5,590,267 and 5,452,406 both titled METHOD AND SYSTEM FOR SCALABLE BORDERS THAT PROVIDE AN APPEARANCE OF DEPTH. Note however, that the above identified documents focus on the scalable rendering of three-dimensional components. The focus of the present invention claims a method and system for determining a baseline shading property from which any three-dimensional rendering implementation can proceed.

DETAILED DESCRIPTION

Figure 1:
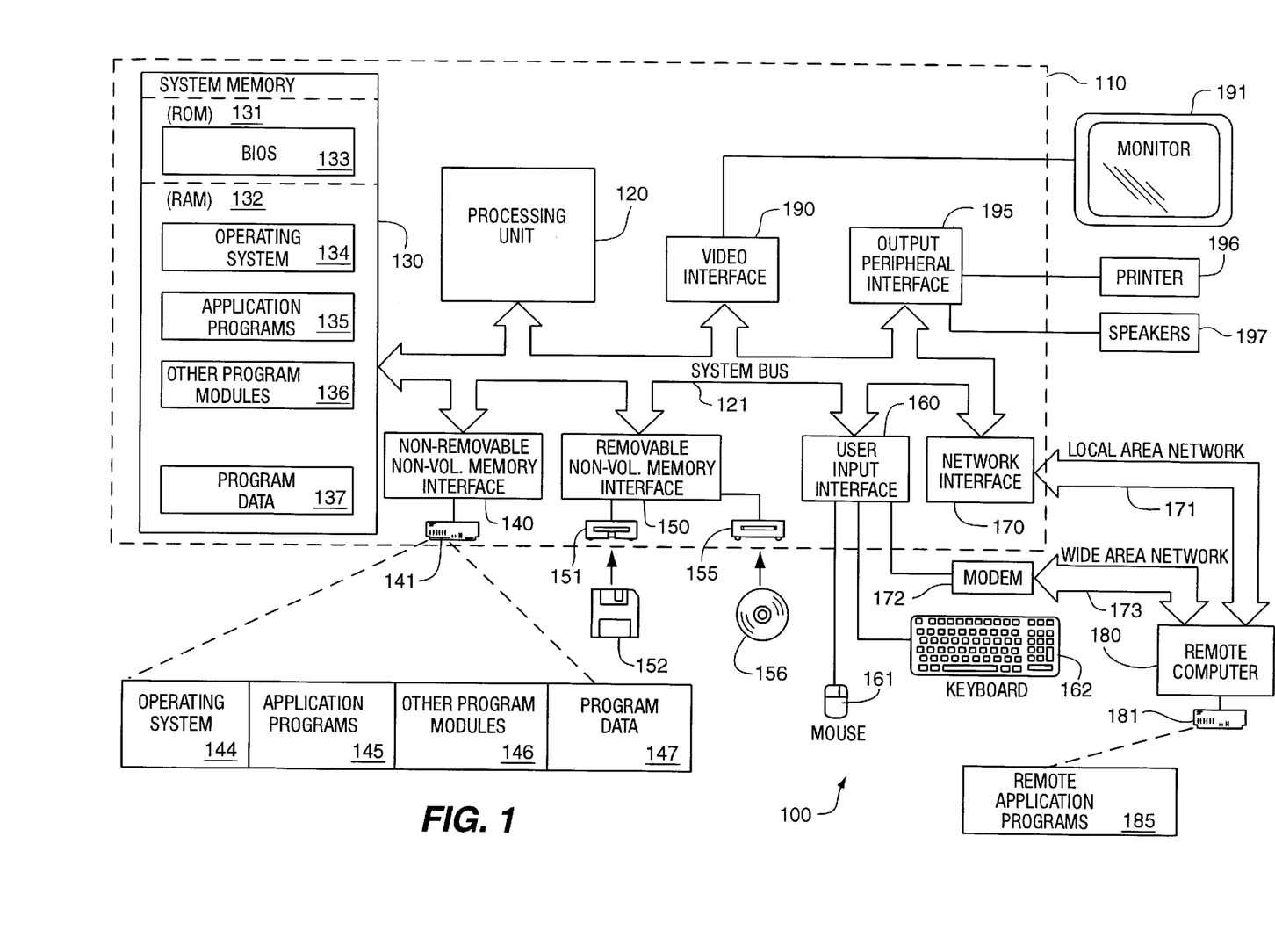
FIG. 1 illustrates an example of a computing system environment in block diagram form on which the claimed invention could be implemented.

Computing System Environment—FIG. 1

FIG. 1 illustrates an example of a computing system environment 100 on which the claimed invention could be implemented. The computing system environment 100 is only one example of a suitable computing environment for the claimed invention and is not intended to suggest any limitation as to the scope of use or functionality of the claimed invention. Neither should the computing environment 100 be interpreted as having any dependency or requirement relating to any one or combination of components illustrated in the exemplary computing system environment 100.

The claimed invention is operational with numerous other general purpose or special purpose computing system environments or configurations. Examples of well known computing systems, environments, and/or configurations that may be suitable for use with the claimed invention can include, but are also not limited to, a general purpose Personal Computer (PC), hand-held or lap top computers, multiprocessor systems, microprocessor-based systems, programmable consumer electronics, network computers, Personal Communication Systems (PCS), Personal Digital Assistants (PDA), minicomputers, mainframe computers, distributed computing environments that include any one or more of the above computing systems or devices, and the like.

The claimed invention may also be described in the general context of computer-executable instructions that are executable on a PC. Such executable instructions include the instructions within program modules that are executed on a PC for example. Generally, program modules include, but are not limited to, routines, programs, objects, components, data structures, and the like that perform discrete tasks or implement abstract data types. The claimed invention may also be practiced in distributed computing environments where tasks are performed by remote processing devices that are linked through a communications network. In a distributed computing environment, program modules may be located in both local and remote memory devices.

The exemplary computing system environment 100 is a general purpose computing device such a PC 110. Components of PC 110 include, but are not limited to, a processing unit 120, a system memory 130, and a system bus 121. The system bus 121 communicatively connects the aforementioned components and numerous other cooperatively interactive components.

Processing unit 120 is the primary intelligence and controller for PC 110 and can be any one of many commercially available processors available in the industry. System bus 121 may be any combination of several types of bus structures including, but not limited to, a memory bus, a memory controller bus, a peripheral bus, and/or a local bus. System bus 121, also referred to as an expansion bus or I/O channel, can be based on any one of a variety of bus architectures including, but not limited to, Industry Standard Architecture (ISA) bus, Micro Channel Architecture (MCA), Enhanced ISA (EISA), Video Electronics Standards Association (VESA) local bus, and Peripheral Component Interconnect (PCI) also known as Mezzanine bus.

System memory 130 is a volatile memory that can include a Read Only Memory (ROM) 131 and/or a Random Access Memory (RAM) 132. ROM 131 typically includes a Basic Input/Output System (BIOS) 133. BIOS 133 is comprised of basic routines that control the transfer of data and programs between peripheral non-volatile memories that are accessible to PC 110 during start-up or boot operations. RAM 132 typically contains data and/or programs that are immediately accessible to and/or presently being operated on by processing unit 120. Types of data and/or programs in RAM 132 can include operating system programs 134, application programs 135, other program modules 136, and program data 137.

Other components in PC 110 include numerous peripheral devices that are accessible to processing unit 120 by way of system bus 121. The peripheral devices are supported by appropriate interfaces that can include a first non-volatile memory interface 140 for non-removable non-volatile memory device support, a second non-volatile memory interface 150 for removable non-volatile memory device support, a user input interface 160 for serial device support, a network interface 170 for remote device communication device support, a video interface 190 for video input/output device support, and an output peripheral interface 195 for output device support.

Examples of a non-removable non-volatile memory device can include a magnetic disk device 141 or other large capacity read/write medium such as an optical disk, magnetic tape, optical tape, or solid state memory. Types of data often stored on a non-removable non-volatile memory device include persistent copies of programs and/or data being used and/or manipulated in RAM 132 such as operating system programs 144, application programs 145, other program modules 146, and program data 147.

One example of a removable non-volatile memory device can include a magnetic floppy disk device or hard disk device 151 that accepts removable magnetic media 152. Another example of a removable non-volatile memory device can include an optical disk device 155 that accepts removable optical media 156. Other types of removable media can include, but are not limited to, magnetic tape cassettes, flash memory cards, digital video disks, digital video tape, Bernoulli cartridge, solid state RAM, solid state ROM, and the like.

User input interface 160 supports user input devices that can include, but are not limited to, a pointing device 161 commonly referred to as a mouse or touch pad, and a keyboard 162. Other user input devices can include, but are not limited to, a microphone, joystick, game pad, neuro-stimulated sensor, and scanner, and may require other interface and bus structures such as a parallel port, game port or a Universal Serial Bus (USB) for example.

User input/output devices supported by video interface 190 can include a display monitor 191 or a video camera. Output peripheral interface 195 supports output devices such as printer 196 and speakers 197.

Network interface 170 supports communications access to a remote computing facility such as remote computer 180 by way of Local Area Network (LAN) 171 and/or Wide Area Network (WAN) 173, or other Intranet or Internet connection. Other remote computing facility types for remote computer 180 can include, but are not limited to, a PC, server, router, printer, network PC, a peer device, or other common network node. A remote computer 180 can typically include many or all of the components described above for PC 110. Modulator/Demodulator (MODEM) 172 can also be used to facilitate communications to remote computer 180. Types of programs and/or data accessible from remote memory device 181 on remote computer 180 can include, but are not limited to, remote application programs 185.

Figure 2:
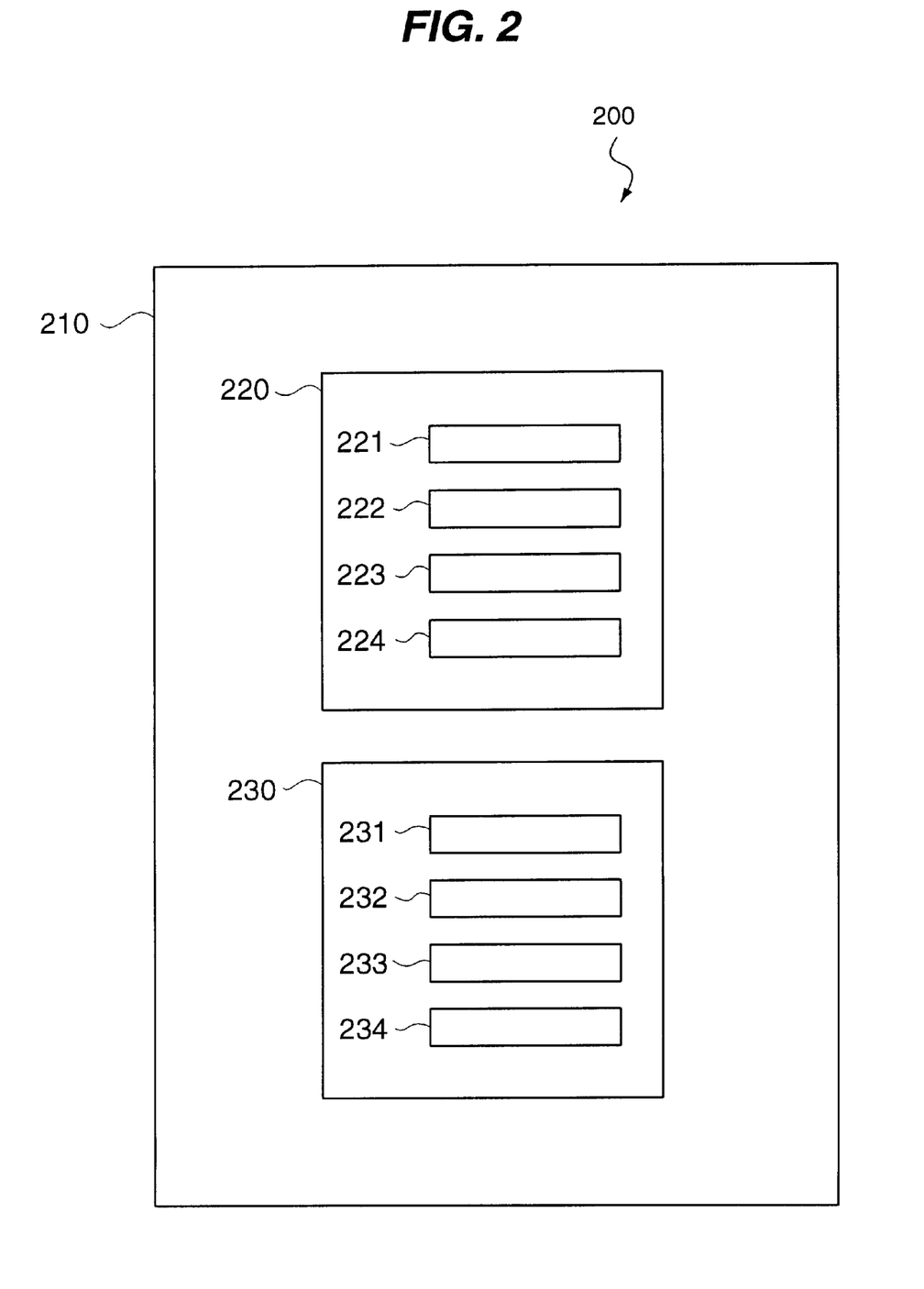
FIG. 2 illustrates an example of hierarchical component and container relationships in block diagram form.

Component Relationship Example—FIG. 2

FIG. 2 illustrates an example of component and container relationships 200 in block diagram form as they might appear on the display of monitor 191, also referred to as a display screen. For purposes of the present discussion, a component is any viewable object or other object whether or not it can take input focus. Similarly, a container is a component that contains lower level components in a hierarchical manner. That is, a parent component can be a container that contains one or more child components.

For example, the component and container relationship example 200 illustrates eleven components 210–234 that are organized hierarchically. Component 210 is at the root of the component hierarchy and is also referred to as a container or parent component because lower level or child components 220–234 are contained therein. Components 220 and 230 are also referred to as containers or parent components because lower level or child components 221–224 and 231–234 are contained respectively therein. Components 221–224 and 231–234 are the lowest level components in the present illustration. Examples of a component such as any one of the components 221–224 or 231–234 include, but are not limited to, a data entry field in an electronic form or a file name field an open folder/file window. For purposes of the remainder of this document, containers and parent components are synonymous, and all containers, parent components, and child components are collectively referred generically as components.

Figure 3:
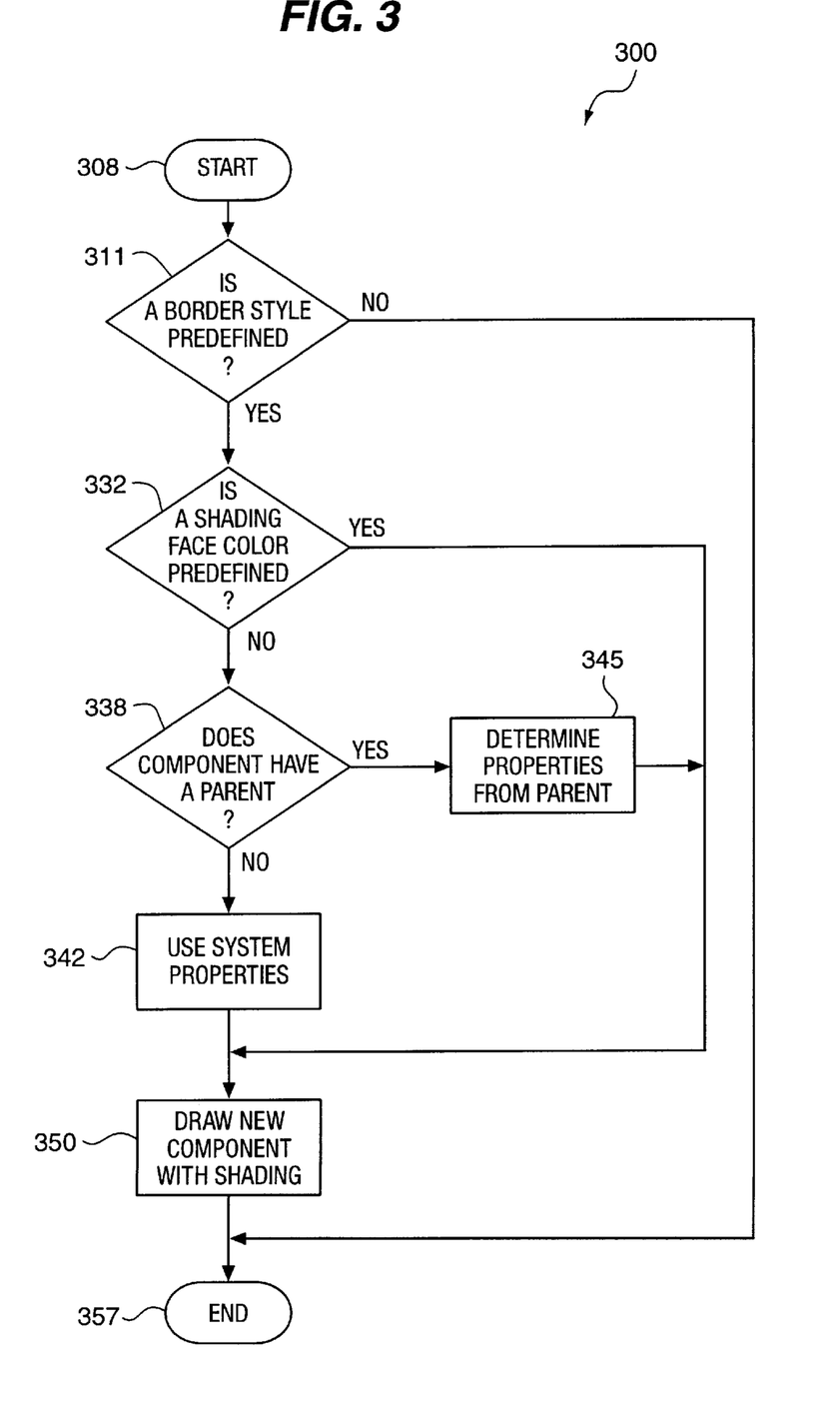
FIG. 3 illustrates an overview of the inheritable property shading system in flow diagram form.
Figure 4:
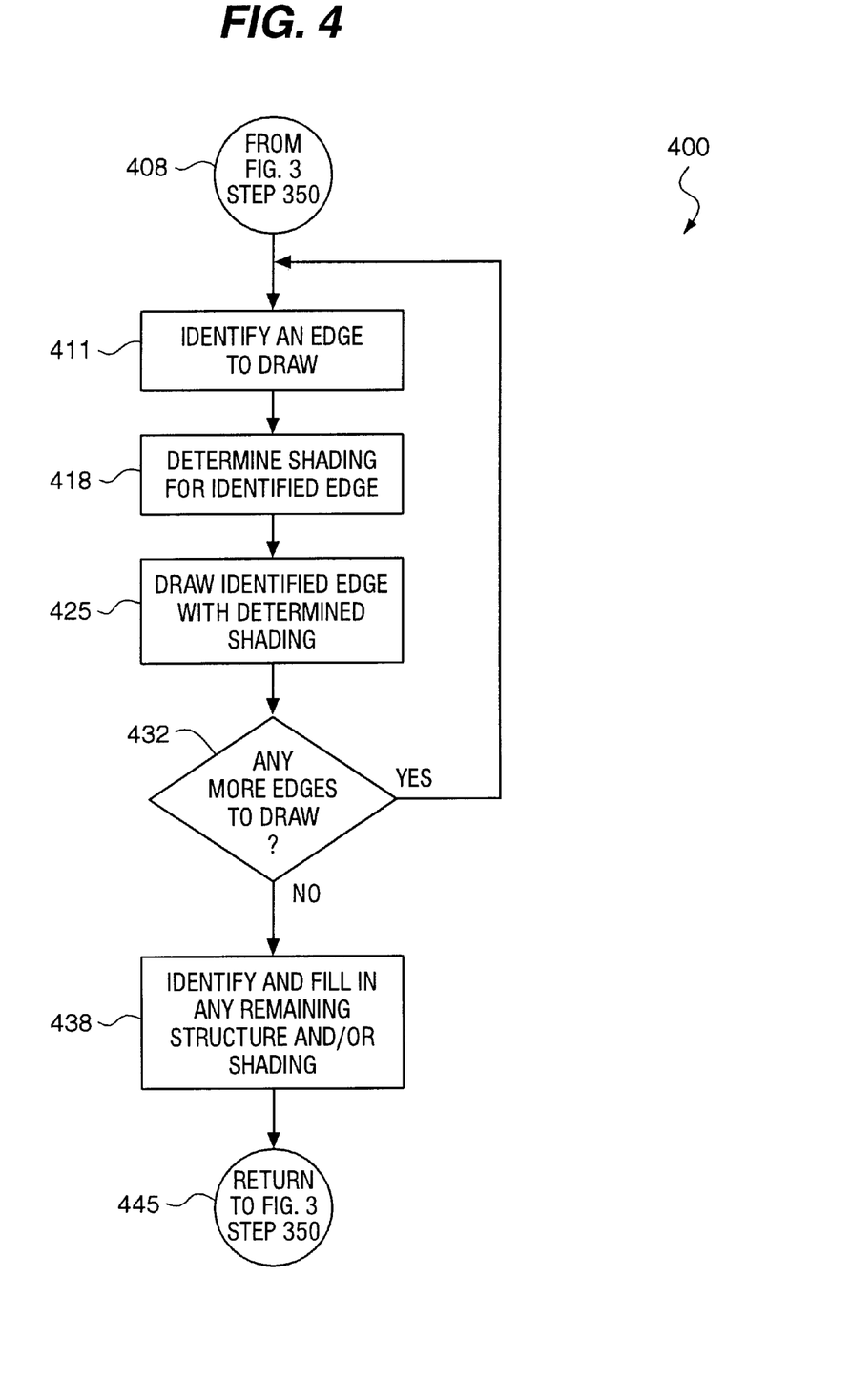
FIG. 4 illustrates inheritable property shading system operational details in flow diagram form.

Shading System Operational Details—FIGS. 3–4

FIG. 3 illustrates an overview 300 of the inheritable property shading system in flow diagram form. The inheritable property shading system overview 300 begins at step 308 given the existence of a new component creation request from any application or process in the computing system 100.

If it is determined at decision step 311 that a predefined display edge style, also known as border properties, exists for the component being generated, then processing continues at step 332 with the predefined properties. Alternatively, if it is determined at decision step 311 that no predefined display edge style exists for use in creating a given component, then the inheritable property shading system processing ends at step 357. A display edge style includes the display edge properties such as the borders or edges that bound a component. Examples of display edge properties include, but are not limited to, minimum and/or maximum border height and boarder widths, inner border and associated border edges, outer border and associated border edges, and the range of logical depths of raised or sunken inner or outer edges.

If it is determined at decision step 332 that a predefined color model, also known as shading properties, exists for the component being generated, then processing continues at step 350 with the predefined color model based on its shading face color. Alternatively, if it is determined at decision step 332 that no predefined color model exists for use in creating the present component, then processing continues at step 338 to determine whether system-wide default or inherited color model will be used. A color model includes the shading properties such as the shading face color from which all other component colors are determined. Examples of shading properties include, but are not limited to, a logical light source, degrees of relative glare and shadow, and a range of luminance.

If it is determined at decision step 338 that the present component has a parent, then processing proceeds to step 345. At step 345, the parent components of the present component are searched for an inheritable shading property and processing proceeds to step 350. Alternatively, if it is determined at decision step 338 that the present component does not have a parent, then system properties are obtained at step 342 and processing proceeds at step 350.

At step 350, the present child component is generated using the appropriate display edge properties and the relative shading properties as previously determined. Details of the component generating operational steps are disclosed in further detail in the text accompanying FIG. 4. At the completion of generating the present component on a display screen for viewing by a user, processing ends at step 357.

FIG. 4 illustrates more detailed inheritable property shading system operational steps 400 in flow diagram form. The shading system operational steps 400 begin at step 408 and represent details of the component generating process from step 350 of FIG. 3.

At step 411, an edge is identified that requires drawing. The edges that form the border of the component in the present example are referred to in terms of a rectangle. However, the principles of creating three-dimensional depth for any geometric border with accompanying shading are considered within the scope of the present invention even if not expressly discussed. Each border is divided into an outer border and an inner border that together create the visual depth cue of an object that is either recessed below a flat surface of the display screen or that extends above the flat surface of the display screen. A number of equivalence classes can also be defined for each of the heights or depths in a range such as −2 through +2 from a neutral or flat surface of 0. Other ranges of equivalence classes can be defined as needed for a given implementation. Specific single borders could include, but are not limited to, a raised inner border of +2, raised outer border of +1, sunken inner boarder of −2, and sunken outer border of −1. However, drawing inner borders and outer borders alone do not satisfy the visual cues of height or depth from a surface without proper shading for a given edge. Different color shading can be defined at the time a baseline shading face color is identified, because specific degrees of shading can be uniformly applied to borders of specific equivalence classes.

At step 418, an appropriate shade is determined for the edge identified in step 411 based on calculation from the shading face color from the shading properties previously identified in steps 332, 338, and/or 345. Shading of borders is used to enhance the visual cue of height or depth from a surface. The shades used for different depths or heights for an inner border and an outer border are defined in relative terms that may be easily scaled to the range of colors supported by different video cards and display screens. One common way to calculate shading is by defining a two level maximum transition of depth or height. That is, the total number of shades required to completely shade the outer and inner borders are calculated as the sum of 1 and 2 times the maximum desired depth or height (1+(2*2)=5). The maximum depth or height is multiplied by 2 in the preceding calculation to account for the border having inner and outer border parts.

The surface of each border is designed to portray the composition of materials that treat light and color differently. For example, a solid-color metallic material will reflect much of the light that strikes the surface so that linear color changes must be used accordingly. Further, a shadow border edge is one that neither receives direct light nor has a line of sight with a fixed light source from, say a top left-hand corner position. Similarly, a glare border edge is one that receives both direct light and has a line of sight with the light source. A neutral or glance border edge receives only diffuse or indirect light from the light source. The glare border edges mark transitions from a flat surface below the level of another flat surface, and the shadow border edges mark transitions from a flat surface above the level of another flat surface. The result of the many shading options that are well known in the art is that the border shading will vary depending on the surface material being portrayed, the colors involved, and the lighting perspective.

Changes in border shading to differentiate depths and heights are further enhanced by varying the luminance of portions of the borders. The luminance is a measure of the brightness or darkness of a color at is appears on the display screen and are limited by the capacity of the display screen and supporting video card. In general, most display screens and their supporting video cards specify colors according to a red, green, blue (RGB) scale. Depending on the system, a conversion may also be necessary or useful from RGF scales to a hue, saturation, and value (HSV) scale for defining colors. Hue refers to a color family, saturation refers to a quantified color intensity, and value represents the gradation of color with respect to the magnitude of an amount of white in the color. Regardless of whether RGF scales or HSV scales are used, a range of luminance is defined and partitioned around the baseline shading face color from which all other shades are derived. Depending on the portion of a border being constructed at any given time, an appropriate shade is selected and applied for the height or depth of visual cue desired.

At step 425, a given edge is drawn on the display screen along with a given color shading calculated from step 418. If it is determined at decision step 432 that there are more edges to draw before the present component is complete, then processing continues at step 411 as previously disclosed. Alternatively, if it is determined at decision step 432 that there are no more edges to draw for the present component, then processing continues at step 438. At step 438, any remaining background or foreground or other component feature colors that remain unpainted, are now identified and filled in according to the defined color model based on the identified baseline shading face color. The draw edge and shading steps for generating a component are complete at step 445 and processing returns to step 350 of FIG. 3.

Figure 5:
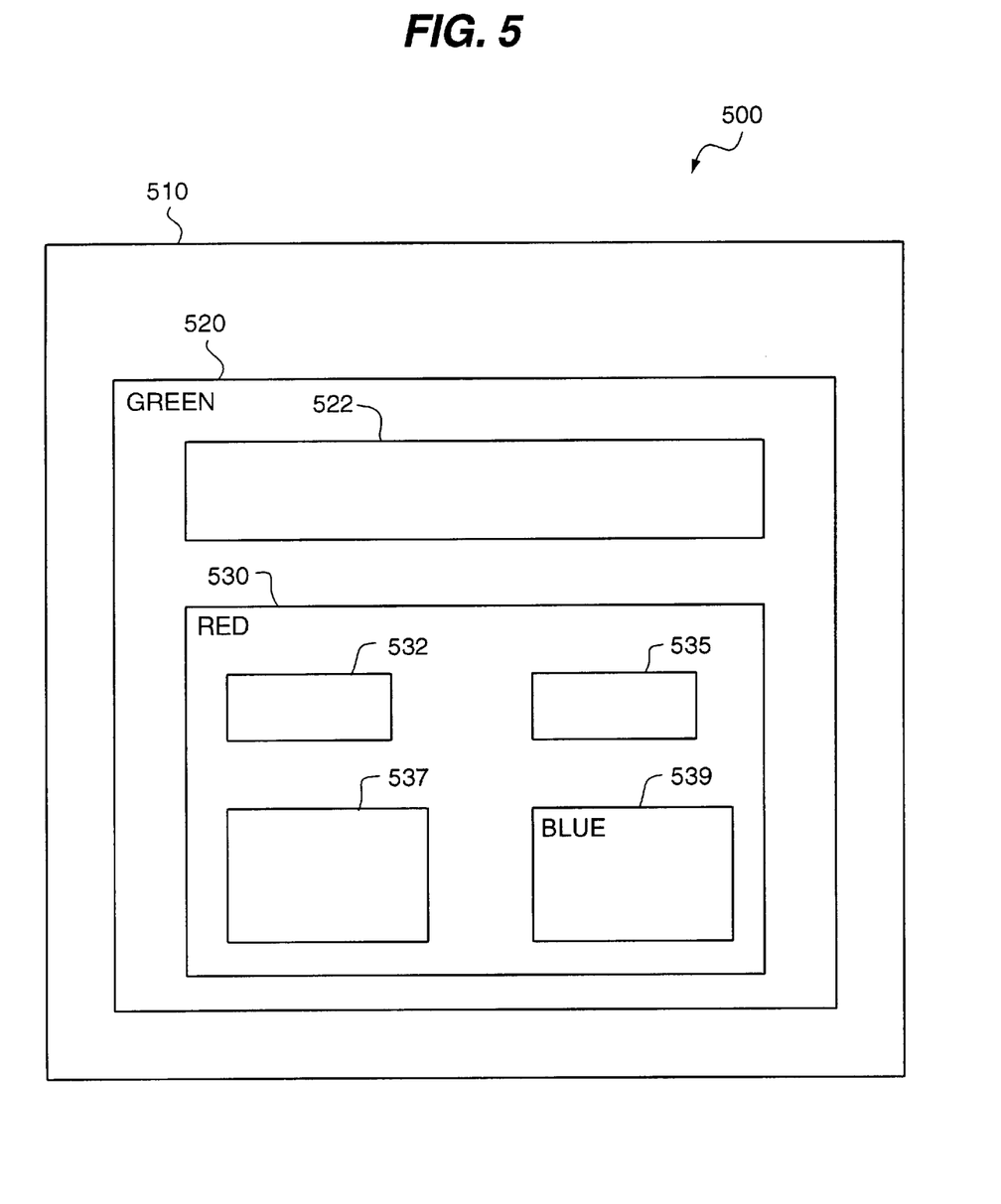
FIG. 5 illustrates an inheritable property shading system inheritance example in block diagram form.

Inherited Properties Example—FIG. 5

FIG. 5 illustrates an inheritable property shading system example 500 in block diagram form. The inheritance example 500 illustrates eight hierarchically organized components 510, 520, 522, 530, 532, 535, 537, and 539. For purposes of example, assume that component 510 is the root or top-level component and that a shading face color was not expressly set for component 510. In this situation, component 510 will obtain its shading face color from a system property setting because there is no other shading face color source. If the system property setting for a shading face color is yellow, then component 510 will take yellow as its shading face color. Note that only a root or top-level component will take its shading face color from the system property settings if no other color is expressly stated.

As component 520 is created it is expressly set to the shading face color green. Because an expressly set shading face color takes precedent over inheriting a shading face color from a parent, component 520 will take the shading face color of green rather than inheriting yellow from its parent component 510. As component 522 is created and because it is not expressly given a shading face color, component 522 will search for a parent component from which it can inherit shading face properties. Component 522 will find parent component 520 from which it can inherit the shading face color green.

As component 530 is created it is expressly set to the shading face color red, which is different from its parent component 520 that has the expressly set shading face color green. As child component 539 is created it is expressly set to the shading face color blue rather than its parent component 530 that has the expressly set shading face color red. Similarly, child components 532, 535, and 537 will each inherit the parent component 530 shading face color red.

The basis for determining which parent component will be the one from which a child will inherit its shading face color is beyond the scope of the present discussion. Inheritance choices can include, but are not limited to, the shading face color of the most immediate parent that has color, the shading face color of the most senior parent that has color, the shading face color of the nearest parent that has an inherited color, or the shading face color of the nearest parent that has an expressly set non-inherited color. A default source of a shading face color absent an expressly stated source or an inheritable source from a hierarchical relation, can be from a system property if necessary. For purposes of the present discussion, a child inherits the shading face color of its most immediate parent that has color. Note that shading face colors can change at any time so that the shading face color a component is created with is not a permanent color. For example, component 530 may initially have the shading face color red, but component 530 can later change to a different shading face color for any reason at all. Subsequent shading face colors may be either an expressly set color or an inherited color. Note also that inheriting a shading face color is independent of whether the component inheriting color has or is capable of having input focus, and is independent of whether the component from which the color is inherited has or is capable of having input focus.

Summary

The inheritable property color shading system of the present invention includes the specific advancement of allowing a child component to either take an expressly set shading face color or inherit the shading face color properties of a parent component. Although the methods and systems of the present invention have been described in terms of specific embodiments, it is not intended that the invention be limited to these embodiments, and it is expected that persons skilled in the art can and will make, use, and/or sell alternative inheritable property color shading systems in a manner that is within the scope of the following claims either literally or under the Doctrine of Equivalents. The scope of the present invention is defined only by the claims that follow.

What is claimed is:

1. A method for obtaining shading properties for use in generating a display on a display screen of a computer system that includes a memory, a processor, a plurality of processes executable on said processor, and said display screen, said method comprising:

requesting a display of a new component on said display screen by way of a display request from one of said plurality of processes;

identifying baseline component display properties that defined display characteristics for said new component by way of an escalatable search through a plurality of display property sources in order of an expressly defined property in said display request first, an inheritable property of parent components second, and a system property third;

calculating varying degrees of said baseline component display properties to enhance user observable three-dimensional visual cues of height and depth of said new component relative to a two-dimensional surface; and rendering said new component in response to said step of calculating.

2. A method according to claim 1 wherein said step of rendering includes:

storing new baseline component display properties in said memory for said new component for inheritance by future child components of said new component.

3. A method according to claim 1 wherein said step of identifying baseline component display properties includes:

locating a baseline shading face color from which uniform gradations of shading can be determined.

4. A method according to claim 1 wherein said step of calculating includes:

determining a plurality of shades of a baseline shading face color; and associating one of said plurality of shades to a corresponding portion of said new component.

5. A method according to claim 1 wherein said step of requesting said display includes:

requesting a refreshed display of an existing component on said display screen.

6. A machine readable memory tangibly embodying instructions executable by a computer system to perform a method for shading a three-dimensional view of a given component on a display screen of said computer system, said method comprising:

requesting a display of said given component on said display screen by way of a display request from a process in said computer system, wherein said display request can result in a display refresh of said given component;

identifying a shading face color for said given component by way of an escalatable search of a plurality of shading property sources that include inheritable properties of a hierarchical relative of said given component, wherein if said shading face color is predefined then the escalatable search includes using the predefined shading face color, but if said shading face color is not predefined then the escalatable search includes using an inherited shading face color from a parent of the component; and rendering said given component on said display screen based on said shading face color.

7. A method according to claim 6 wherein said step of identifying said shading face color includes:

locating said shading face color in said display request;

searching for said shading face color in an inheritable property of said hierarchical relative in an absence of said shading face color expressly stated for said given component; and adopting said shading face color from a set of system properties in an absence of said shading face color from said inheritable property.

8. A method according to claim 6 wherein said step of rendering includes:

calculating varying degrees of said shading face color to enhance user observable three-dimensional visual cues of height and depth of said given component relative to a two-dimensional surface.

9. A method according to claim 8 wherein said step of calculating includes:

determining a plurality of shades of said shading face color; and associating one of said plurality of shades to each corresponding one of a plurality of borders of said given component.

10. An inheritable property shading system for use in three-dimensional rendering of a component on a display screen of a computer system, said system comprising:

means for rendering a given component on said display screen based on at least one baseline shading property identified by way of an escalatable search of a plurality of shading property sources that include an inheritable property of a parent component;

means for escalating said escalatable search of said plurality of shading property sources in order of an expressly defined property associated with said given component first, said inheritable property of said parent component second, and a system property third;

means for calculating varying degrees of said at least one baseline shading property to enhance user observable three-dimensional visual cues of height and depth of said given component relative to a two-dimensional surface; and means for rendering said given component in response to said means for calculating.

11. A system according to claim 10 wherein said means for rendering includes:

means for determining a shading face color for said given component from an express shading face color property associated with said given component;

means for searching for said shading face color for said given component in said inheritable property of said parent component in an absence of said shading face color in said express shading face color property associated with said given component; and means for obtaining said shading face color from a set of system properties in an absence of said shading face color from said inheritable property of said parent component.

12. A system according to claim 10 wherein said means for calculating includes:

means for determining a plurality of shades of a shading face color one of said at least one baseline shading property; and means for associating one of said plurality of shades with at least one portion of said given component.

13. A system according to claim 10 wherein said means for rendering includes:

means for rendering said given component for a first time; and means for refreshing a previous rendering of said given component.

* * * * *